United States Patent
Yoon

(10) Patent No.: US 7,451,406 B2
(45) Date of Patent: Nov. 11, 2008

(54) DISPLAY APPARATUS AND MANAGEMENT METHOD FOR VIRTUAL WORKSPACE THEREOF

(75) Inventor: Sung-min Yoon, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 623 days.

(21) Appl. No.: 11/132,453

(22) Filed: May 19, 2005

(65) Prior Publication Data

US 2005/0273466 A1 Dec. 8, 2005

(30) Foreign Application Priority Data

May 20, 2004 (KR) ............... 10-2004-0036139

(51) Int. Cl.
*G06F 3/14* (2006.01)
*G06F 7/02* (2006.01)
*G06F 7/76* (2006.01)
*G06F 17/30* (2006.01)
*G06F 3/01* (2006.01)

(52) U.S. Cl. ............... 715/806; 715/788; 715/804; 715/805; 715/778; 707/101; 707/102; 707/104.1

(58) Field of Classification Search ............... 715/804, 715/762, 778, 853, 781, 806, 805, 788; 707/102, 707/104.1, 101
See application file for complete search history.

(56) References Cited

U.S. PATENT DOCUMENTS

| 5,533,183 A | 7/1996 | Henderson, Jr. et al. |
| 5,621,874 A | 4/1997 | Lucas et al. ............... 395/761 |

FOREIGN PATENT DOCUMENTS

| JP | 6-187118 | 7/1994 |
| JP | 2002-175141 | 6/2002 |
| KR | 1994-0020206 | 9/1994 |
| KR | 2000-50876 | 8/2000 |
| KR | 2000-51578 | 8/2000 |

OTHER PUBLICATIONS

Chinese Office Action dated Aug. 11, 2006 in corresponding Chinese Patent Application No. 2005100709644.

*Primary Examiner*—Tadesse Hailu
*Assistant Examiner*—Namitha Pillai
(74) *Attorney, Agent, or Firm*—Sttas & Halsey LLP

(57) ABSTRACT

A method of a display apparatus managing a plurality of virtual workspaces of including generating a first data structure as a reference of at least a window; generating a second data structure as a reference of windows respectively linked to the virtual workspaces on the basis of the first data structure; generating a third data structure as a reference of a shared window linked to all of the virtual workspaces; selecting one of the plurality of virtual workspaces; and displaying the shared window and/or the window linked to the selected virtual workspace on the basis of the first data structure, the second data structure, and the third data structure.

1 Claim, 9 Drawing Sheets

DISPLAY APPARATUS AND MANAGEMENT METHOD FOR VIRTUAL WORKSPACE THEREOF

CROSS-REFERENCE TO RELATED APPLICATION

This application claims the benefit of Korean Patent Application No. 2004-36139, filed 20 May 2004, in the Korean Intellectual Property Office, the disclosure of which is incorporated herein by reference.

BACKGROUND OF THE INVENTION

1. Field of the Invention

The present invention relates to a display apparatus and a method of managing a virtual workspace of the display system, and more particularly, a display apparatus and a method providing a plurality of virtual workspaces by simplifying a data structure corresponding to each of the plurality virtual workspaces to quickly and safely switch from one workspace to another workspace while providing a UI (User Interface) so that a user can easily manage the plurality of workspaces therethrough.

2. Description of Related Art

Recently, computers have been developed to achieve high performance with highly upgraded memory, and accordingly such computers are widely applied to various working areas requiring computer-based performance. Further, development of digital technology accelerates the extension of the computer-based working areas. For example, computers support immense working areas by providing word processing for documentation, searching various data through a network such as an Internet, and multimedia environments by applying a DVD drive or a TV-card, for example.

A computer is connected to a display apparatus such as a monitor to display various images thereon. However, if a display apparatus displays a plurality of windows at once, a UI is complicated due to limitation in physical size of the display apparatus.

For example, if a user want to perform many tasks such as word processing, DVD playback or Internet browsing in the display apparatus, a corresponding number of windows are activated on the screen of the display apparatus. Herein, although the computer can performs all the tasks at once, the user does not feel comfortable performing the tasks because many windows are displayed on the screen.

Thus, the user closes the windows currently not in use to avoid being confused by too many activated windows.

To solve this uneasiness and confusion resulting from the limitation in physical size of the display apparatus, a concept of virtual workspace or virtual desktop is newly introduced. The virtual workspace makes the display apparatus act like it has a lot more workspaces than it physically has by dividing the workspace of the display apparatus into a plurality of virtual workspaces, and thus one of the plurality of virtual workspaces is selected to display a corresponding window on the screen. In this case, other windows linked to the unselected plurality virtual workspaces are hidden. Accordingly, although a window is activated, the window may be not displayed on the screen depending whether the window is linked to the selected virtual workspace.

Here, in application of the virtual workspace, the user requires an easy UI consuming a minimum system resource or a minimum memory space to operate the respective virtual workspaces.

BRIEF SUMMARY

Accordingly, it is an aspect of the present invention to provide a display apparatus and a method of the display apparatus supporting a plurality of virtual workspaces, shifting from one virtual workspace to another virtual workspace quickly and safely by simplifying data structure for the respective virtual workspaces and providing a user interface managing the plurality of virtual workspaces of the display apparatus with ease.

The foregoing and/or other aspects of the present invention are also achieved by providing a method of managing a plurality of virtual workspaces of a display apparatus including: generating a first data structure as a reference of at least a window; generating a second data structure as a reference of windows respectively linked to the virtual workspaces on the basis of the first data structure; generating a third data structure as a reference of a shared window linked to all of the plurality of virtual workspaces; selecting one of the plurality of virtual workspaces; and displaying the shared window and/or the window linked to the selected virtual workspace on the basis of the first data structure, the second data structure, and the third data structure.

The first data structure may include data on the virtual workspace to which the window is linked, and data about an array the window to be displayed on the virtual workspace.

The selecting one of the plurality of virtual workspaces may include displaying a UI (User Interface) to select one of the plurality of virtual workspaces, and selecting one of the plurality of virtual workspaces through the UI.

The UI may include a selection bar provided to select one of the plurality of virtual workspaces therefrom, a display window displaying a currently displayed virtual workspace.

The UI may include a window shift bar; clicking the window shift bar; selecting one of the windows displayed on the currently displayed virtual workspace; selecting the virtual workspaces to which the selected window is going to be moved; and correspondingly modifying the first data structure as a reference to the selected window moved to the selected virtual workspace.

The UI may include a mouse-on bar; setting corresponding regions for the respective virtual workspaces on a screen; clicking the mouse-on bar; detecting a location of a cursor on the screen; if the cursor is located on one of the corresponding regions for the respective virtual workspaces as a result of the detecting, displaying the shared window and/or the window linked to the virtual workspace corresponding to the region on which the cursor is located.

The displaying the shared window and/or the window linked to the selected virtual workspace may include displaying virtual workspace information on the screen for a given period time to inform which virtual workspace is selected.

According to another aspect of the present invention, a display apparatus supporting a plurality of virtual workspaces includes: a data storage storing a first data structure as a reference of at least a window, a second data structure as a reference of windows respectively linked to the virtual workspaces on the basis of the first data structure and a third data structure as a reference of a shared window linked to all of the virtual workspaces; and a controller providing a user interface (UI) to select one of the plurality of virtual workspaces and controlling display of the shared window and/or the window linked to the selected virtual workspace on the basis of the first data structure, the second data structure, and the third data structure on the screen.

According to another aspect of the present invention, there is provided a method of shifting from one of a plurality of virtual workspaces to another of the plurality of virtual workspaces, including: generating a first data structure as a reference of at least a window; generating a second data structure as a reference of windows respectively linked to the virtual workspaces on the basis of the first data structure; selecting the window as a window to be moved; selecting one of the virtual workspaces to be moved; determining whether the selected virtual workspace and the currently displayed virtual workspace are the same and displaying the selected window on the selected virtual workspace when the selected virtual workspace is determined to be the same as the currently displayed virtual workspace by linking the selected window to the selected virtual workspace; determining whether the selected window is a shared window when the selected virtual workspace is determined not to be the same as the currently displayed virtual workspace, displaying the selected window on the first virtual workspace when the selected window is determined to be the same as the shared window, and changing the first data structure and the second data structure of the selected window so as to link the selected window to the another virtual workspace; and ending display of a window moved to the currently displayed virtual workspace by deleting the first data structure for the selected window in the second data structure for the currently displayed virtual workspace.

Additional and/or other aspects and advantages of the present invention will be set forth in part in the description which follows and, in part, will be obvious from the description, or may be learned by practice of the invention.

BRIEF DESCRIPTION OF THE DRAWINGS

These and/or other aspects and advantages of the present invention will become apparent and more readily appreciated from the following detailed description, taken in conjunction with the accompanying drawings of which.

DETAILED DESCRIPTION OF EMBODIMENTS

Figure 1:
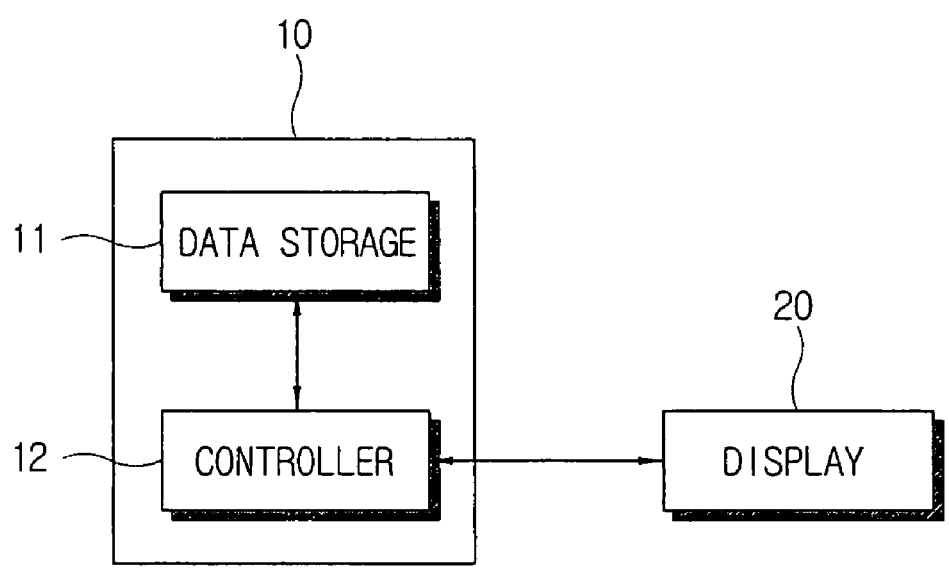
FIG. 1 is a control block diagram of a display apparatus according to an embodiment of the present invention.

Reference will now be made in detail to an embodiment of the present invention, examples of which are illustrated in the accompanying drawings, wherein like reference numerals refer to the like elements throughout. The embodiment is described below in order to explain the present invention by referring to the figures.

FIG. 1 is a control block diagram of a display apparatus according to an embodiment of the present invention. As shown therein, the display apparatus includes a display 20, and a computer main body 10 having a data storage 11 and a controller 12.

The display 20 includes a screen (not shown) to display an image thereon. The display 20 is a device receiving and processing an image signal from the computer main body 10 and displaying the processed image signal on the screen. For example, the display 20 may include a variety of devices such as an LCD (Liquid Crystal Display), a PDP (Plasma Display panel), or a DLP (Digital Lighting Processing).

Referring to FIGS. 1-5, the data storage 11 stores a first data structure DS1 as a reference to a window displayed on the display 20; and a second data structure DS2 as a reference to windows respectively linked to a plurality of virtual workspaces VWS1, VWS2, VWS3 and VWS4 based on the first data structure DS1. Further, the data storage 11 stores a third data structure DS3 as a reference to a shared window linked to all of the virtual workspaces VWS1, VWS2, VWS3, and VWS4.

The controller 12 provides a user interface (UI) 30 to select one of the virtual workspaces VWS1, VWS2, VWS3, and VWS4. The controller 12 displays the shared window and/or the window corresponding to the virtual workspace selected through the UI 30 on the screen of the display 20 based on the first data structure DS1, the second data structure DS2, or the third data structure DS3 stored in the data storage 11. Accordingly, the controller 12 manages the plurality of virtual workspaces VWS1, VWS2, VWS3, and VWS4.

Figure 2:
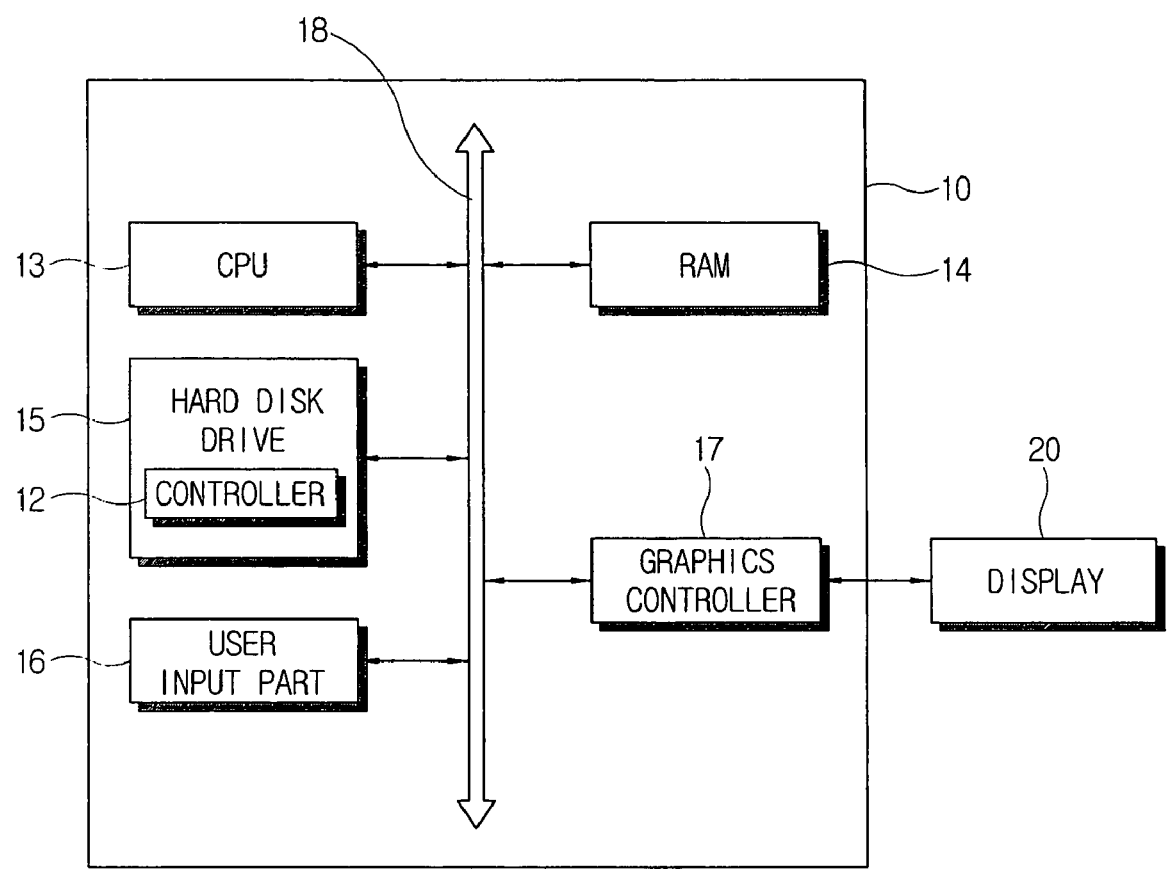
FIG. 2 is a detailed control block diagram of the display apparatus of FIG. 1.

FIG. 2 illustrates the display apparatus of FIG. 1 in more detail. As shown therein, the computer main body 10 of the display apparatus includes a CPU 13, a hard disk drive 15, a RAM 14 as a main memory, a graphics controller 17 processing an image signal outputted to the display 20, an user input device 16 such as a mouse or a keyboard and a system bus 18 connecting these components of the computer main body 10.

The controller 12 is an application program run from an operating system of the computer main body 10. Accordingly, the controller 12 is stored in the hard disk drive 15. Herein, if a user executes the controller 12, the controller 12 is resided in the RAM 14 and executed by the CPU 13.

Further, the data storage 11 may comprise the RAM 14. For example, the data storage 11 temporarily stores the first data structure DS1, the second data structure DS2 and the third data structure DS3 in the RAM 14 when the controller 12 is executed. Also, the data storage 11 can delete these data structures from the RAM 14 if the execution of the controller 12 is terminated.

The data storage 11 includes a secondary memory unit such as the hard disk drive 15. Thus, the third data structure DS3 for the shared window is stored in the hard disk drive 15, and if the controller 12 is executed, the third data structure DS3 stored in the hard disk is temporarily stored in the RAM 14. Accordingly, the shared window does not need to be re-registered whenever the controller 12 is executed.

Figure 3:
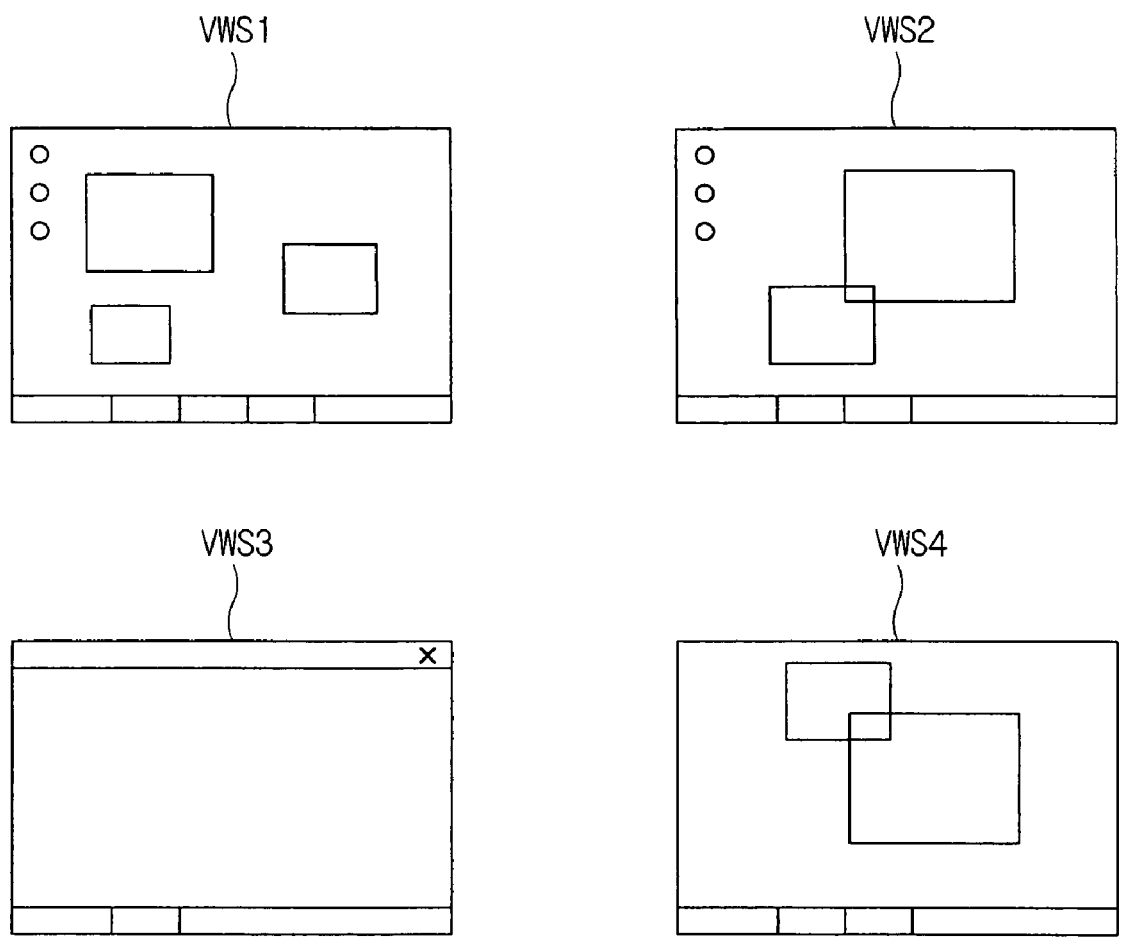
FIG. 3 is an illustration of a plurality of virtual workspaces.

FIG. 3 illustrates four different virtual workspaces VW1, VW2, VW3, and VW4 in a condition where the controller 12 supports four different virtual workspaces. As shown therein, if the user executes the controller 12, the controller 12 generates four virtual workspaces VWS1, VWS2, VWS3, and VWS4. Herein, each of the virtual workspaces VWS1, VWS2, VWS3, and VWS4 is temporarily defined as a first virtual workspace, a second virtual workspace, a third virtual workspace and a fourth virtual workspace, respectively. Here, windows performed and displayed on the first virtual workspace VWS1 are defines as a window 1-1, a window 1-2, and a window 1-3, and so on. Likely, windows on the second virtual workspace VWS2 are a window 2-1, a window 2-2, and so on, and windows performed and display on the third virtual workspace VWS3 and the fourth virtual workspace VW4 are respectively defined in the same manner, as shown in FIG. 3.

Figure 4:
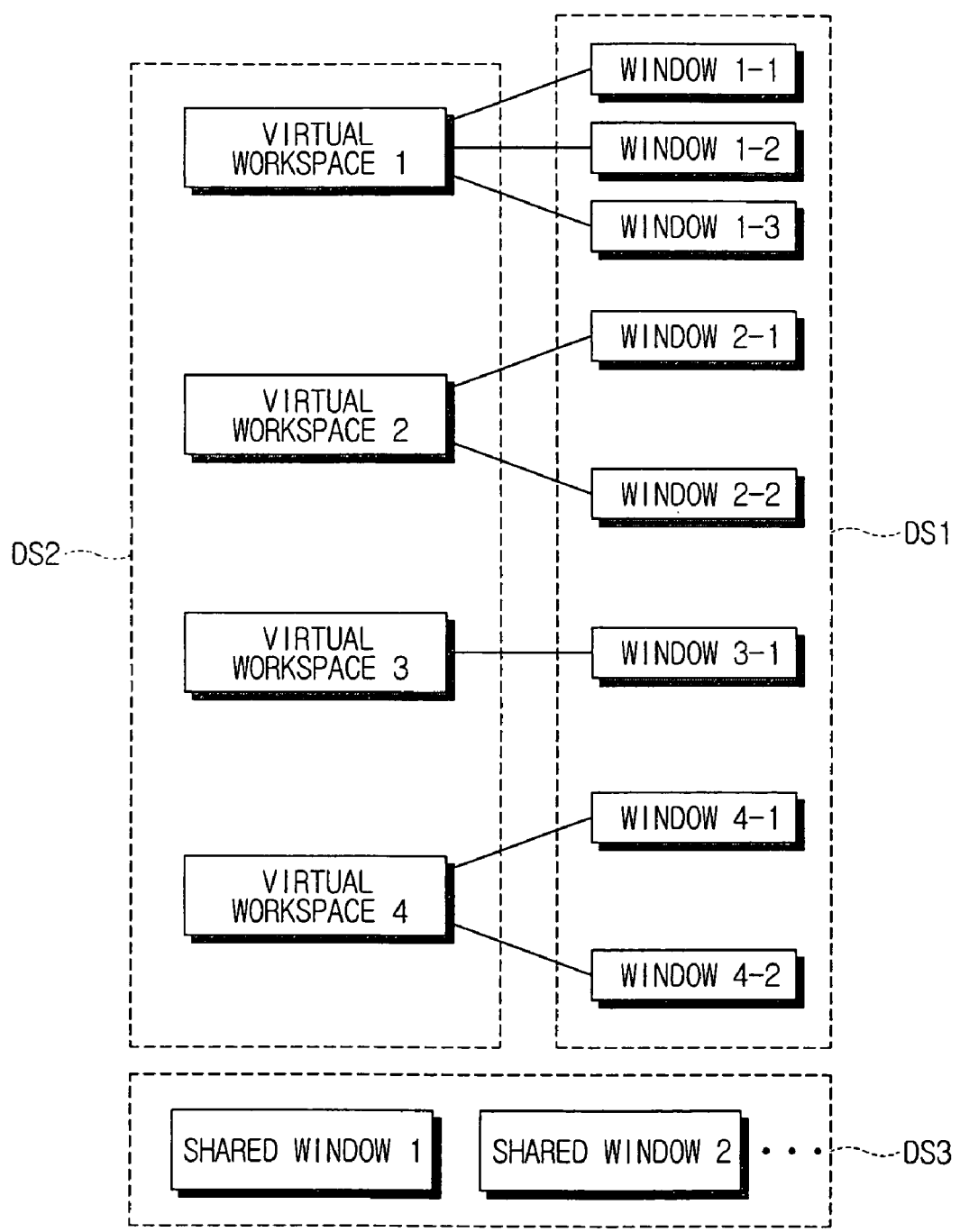
FIG. 4 is an illustration of the relationship between a first data structure, a second data structure and a third data structure.

FIG. 4 describes the relationship between the first data structure DS1, the second data structure DS21 and the third data structure DS3 according to the present embodiment.

Referring to FIG. 4, the first data structure DS1 stores data about windows and the virtual workspace VWS1, VWS2, VWS3, and VWS4 to which the windows are respectively linked. Accordingly, the second data structure DS2 manages the virtual workspaces VWS1, VWS2, VWS3, and VWS4 to which the respective windows are linked based on the data stored in the first data structure DS1.

Further, the first data structure DS1 may contain array data of the windows corresponding to the respective virtual workspaces VWS1, VWS2, VWS3, and VWS4. Accordingly, when the respective virtual workspaces VWS1, VWS2, VWS3, and VWS4 are displayed on the display 20, an array and a position of the respective windows are determined based on the array data stored in the first data structure DS1.

In addition, the first data structure DS1 may determine whether the respective windows are currently available. Thus, when the virtual workspaces VWS1, VWS2, VWS3, and VWS4 are displayed on the display 20, the corresponding windows are displayed on the screen or a tray bar.

Herein, the first data structure DS1 is simply defined by using 'WINDOWHANDLE' as a reference to the window, which is a 'typedef' declaration of an object-oriented programming language such as C++, as shown below. Also, the second data structure DS2 refers to the first data structure defining each of the windows that is linked to the respective virtual workspaces.

```
typedef struct
{
    HWND Handle; // windowhandle
    CStringClassName; // window class name
    CStringCaption; // window caption
    BYTE State; // data of a virtual workspace to which the
    window is linked
    BYTE IsAvailable; //determining whether the window is
    available
    BYTE Num; // data of array
}WINDOWHANDLE;
```

Herein, the shared window data in the third data structure DS3 can be linked to all of the virtual workspaces VWS1, VWS2, VWS3, and VWS4 by setting a value of the 'BYTE State' to a present character like "0."

Further, the second data structure DS2 refers to the first data structure DS1 for the corresponding windows linked to the respective virtual workspaces, as shown in FIG. 4.

Figure 5:
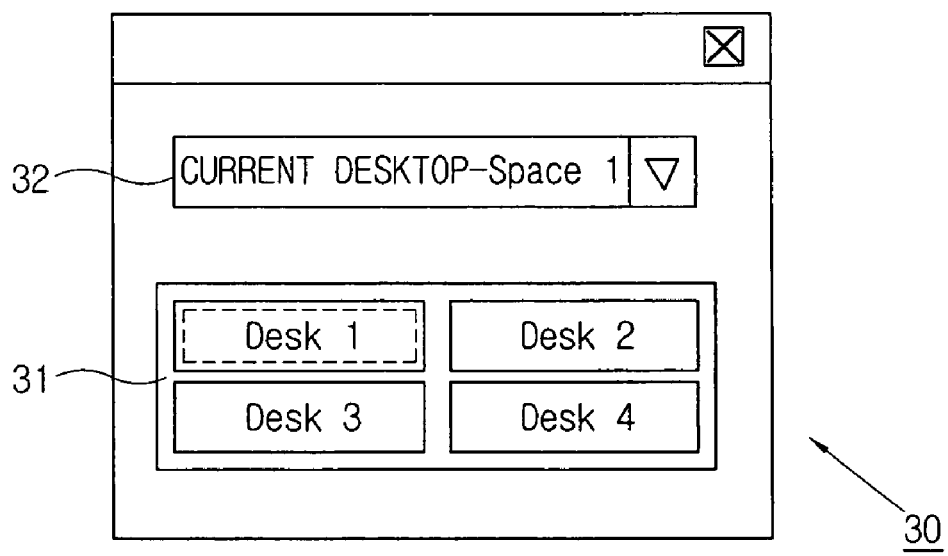
FIGS. 5 and 6 show a UI (User Interface) of the display apparatus of FIG. 1.

Referring to FIG. 5, this figure illustrates the UI 30 according to the present embodiment. The UI 30 includes a selection bar 31 to select one of the virtual workspaces VWS1, VWS2, VWS3, or VWS4. A plurality of selection bars 31 is provided corresponding to respective virtual workspaces VWS1, VWS2, VWS3, and VWS4. Thus, the user selects one of the plurality of selection bars 31 using the user input part 16 to select one of the virtual workspace VWS1, VWS2, VWS3, and VWS4 to be displayed on the display 20.

Further, the UI 30 may include a display window 32 displaying the virtual workspace which is currently selected. For example, if the first virtual workspace VWS1 is displayed on the display 20, the display window 32 displays the following text, "current workspace—Space 1" thereon, as shown in FIG. 5.

Figure 6:
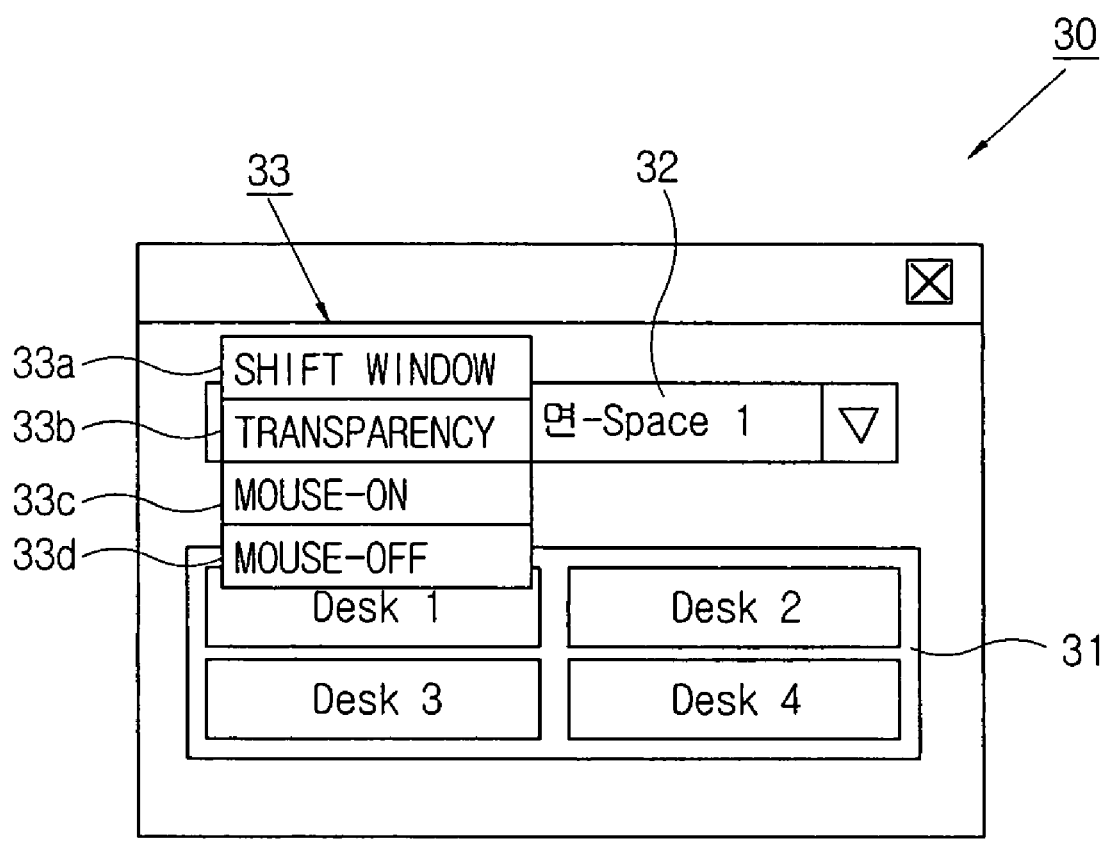

Referring to FIG. 6, the controller 12 provides a popup menu 33 to perform various functions through the UI 30. The popup menu 33 may include a window shift bar 33a. If the user clicks the window shift bar 33a, the window activated to the currently selected virtual workspace can be moved to other virtual workspaces which are not currently displayed. This shift of the window will be described below.

Figure 7:
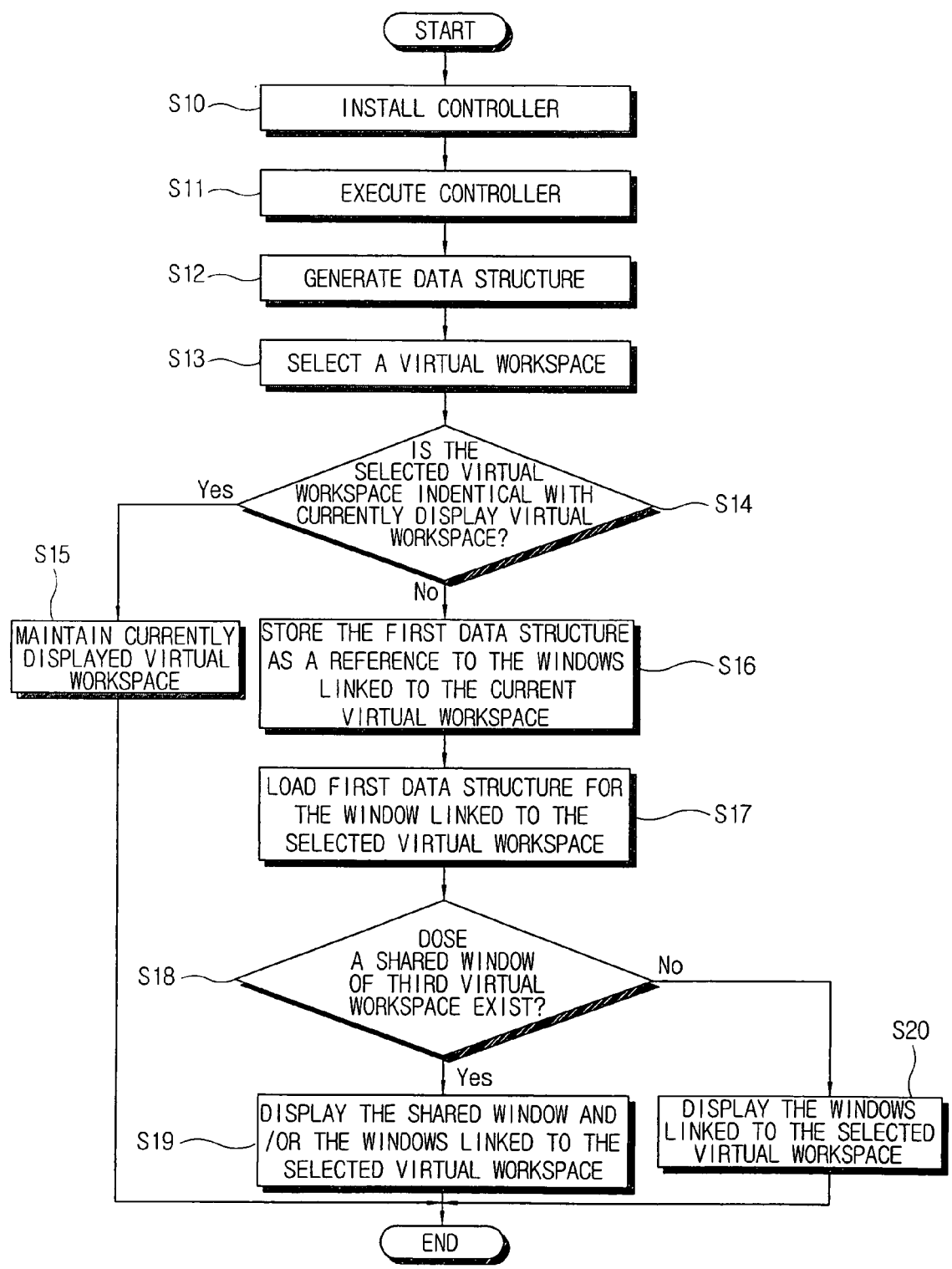
FIGS. 7 and 8 are flowcharts describing a method of the display apparatus managing the plurality of virtual workspaces.

The process by which the display apparatus manages the virtual workspaces VWS1, VWS2, VWS3, and VWS4 will now be described with reference to FIG. 7.

At first, controller 12 is installed to the computer main body 10 at operation S10, and the user executes the controller 12 at operation S11. Then, the CPU 13 makes the controller 12 reside in the RAM 14 and executes the controller 14. Herein, the controller 12 displays the UI 30 on the display 20.

Next, the controller 12 generates the second data structure DS2 for a given number of virtual workspaces VWS1, VWS2, VWS3, or VWS4, at operation S12. Here, the windows displayed on the display 20 before the controller 12 is executed are linked to one of the virtual workspaces VWS1, VWS2, VWS3, and VWS4. These windows are temporarily linked to the first virtual workspace VWS1.

If the user selects one of the virtual workspaces VWS1, VWS2, VWS3, and VWS4 through the UI 30 at operation 13, the controller determines whether the selected virtual workspace is the workspace which is currently displayed on the display 20, that is the first workspace VWS1 at operation S14.

If the selected virtual workspace is identical to the first virtual workspace VWS1, the controller 12 displays the current virtual workspace VWS1, at operation S15.

However, the selected virtual workspace may not be identical with the first virtual workspace VWS1. For example, if the second virtual workspace VWS2 is selected, the controller 12 generates and stores the first data structure DS1 based on the windows currently displayed as a reference to the windows linked to the first workspace VWS1, at operation S16.

Then, the controller 12 loads the first data structure DS1 as the reference of the windows linked to the selected second virtual workspace VWS2, at operation S17.

After that, the controller 12 checks whether the third data structure DS3 as the reference of the shared windows is detected, at operation S18. If the controller 12 detects the third data structure DS3, it displays the windows linked to the selected second virtual workspace VWS2 together with the shared windows on the second virtual workspace VWS2, at operation S19.

However, if the third data structure DS3 for the shared window is not detected, the controller 12 displays the windows linked to the selected second virtual workspace VWS2, at operation S20.

Figure 8:
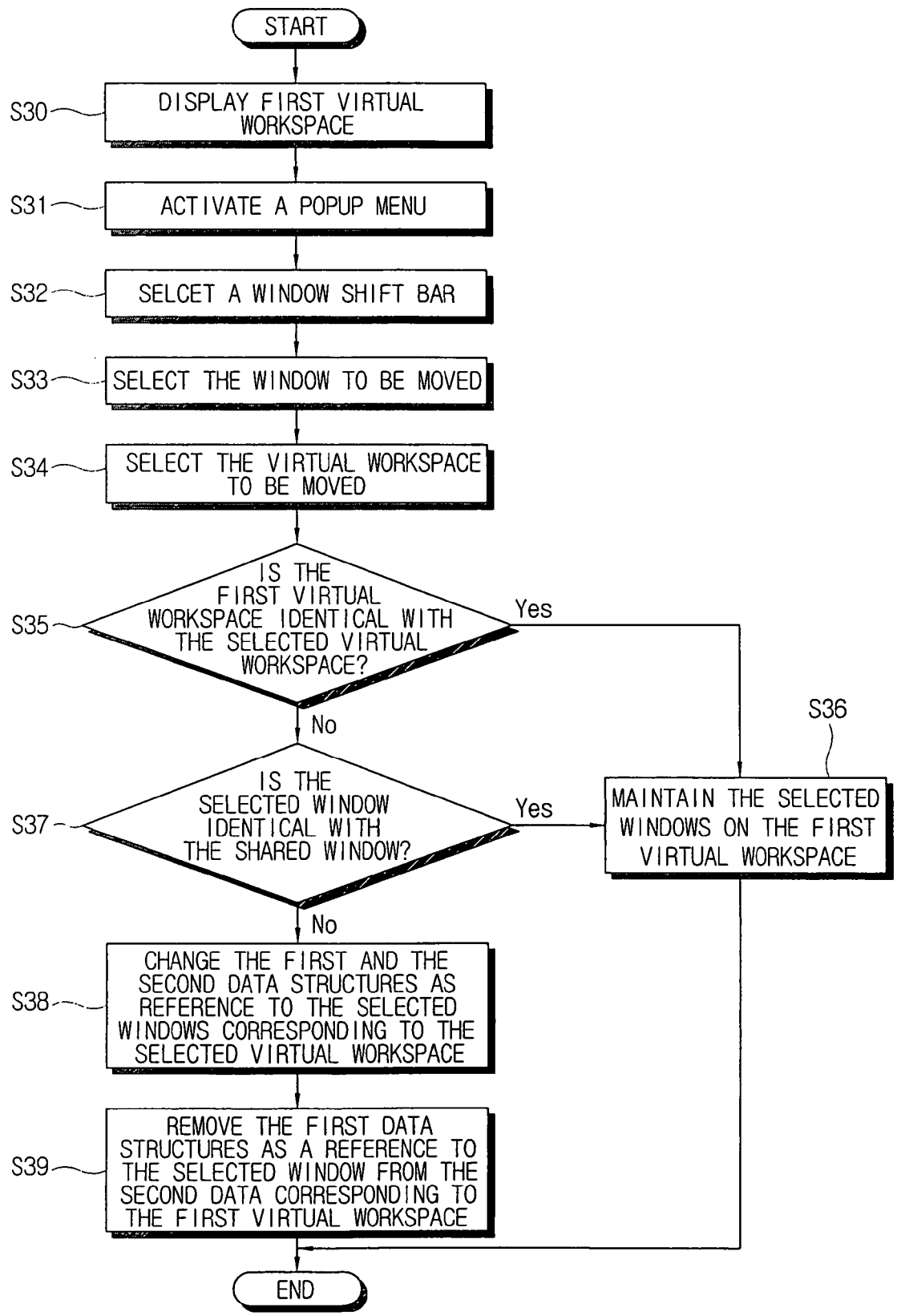

A shifting method of the virtual workspaces VWS1, VWS2, VWS3, and VWS4 of the display apparatus according to the present embodiment of the present invention will be described with reference to FIG. 8. Herein, a current virtual workspace is defined as the first virtual workspace VWS1.

At first, while the first virtual workspace VW1 is currently displayed at operation S30, the user moves a cursor over the UI 30, and clicks a right-mouse button. Herein, the controller 12 activates the popup menu 33 over the UI 30, at operation S31.

Figure 9:
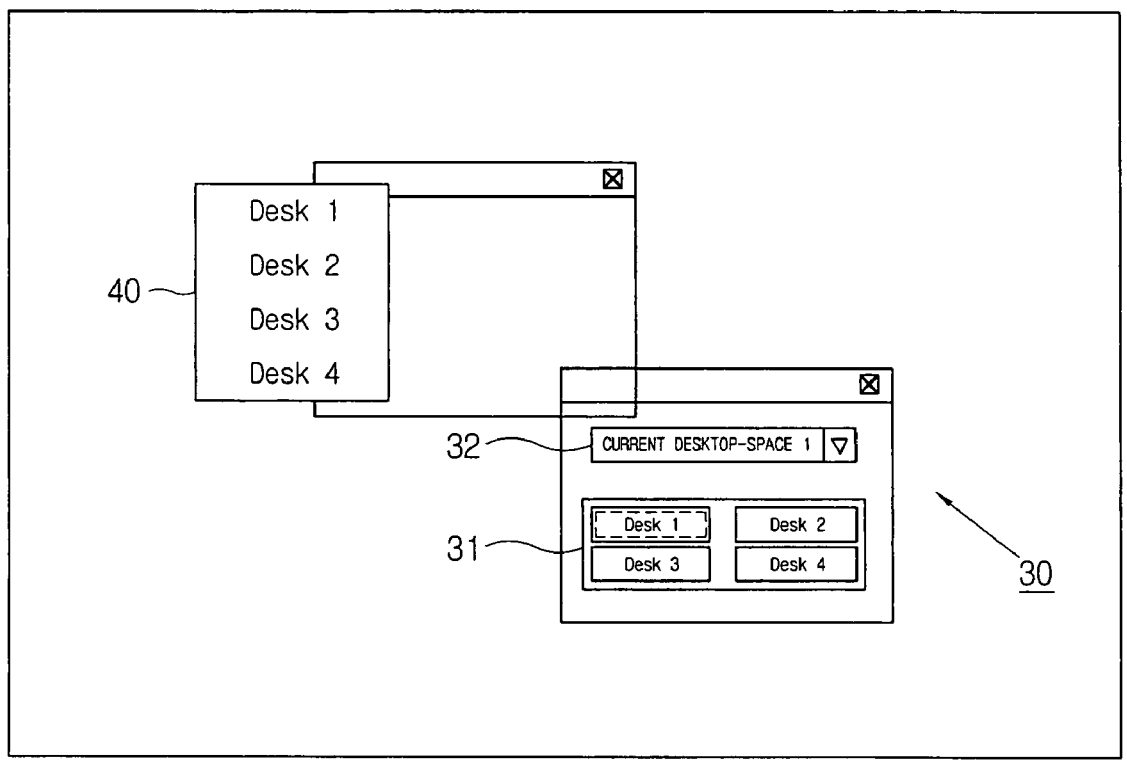
FIG. 9 shows a shift of windows using the UI of the display apparatus of FIG. 1.

Next, the user clicks a left-mouse button to select the window shift bar 33a, at operation S32. Then, the user controls the mouse to move the cursor on an upper left of the window that the user wants to shift, and then clicks the left-mouse button to select the windows, at operation S33. If the user clicks the right-mouse button as shown in FIG. 9, the popup menu 40 is displayed over the window so that the user can select one of the virtual workspaces VWS1, VWS2, VWS3, and VWS4 to which the window is going to be linked.

The user drags the cursor to select one of the virtual workspaces VWS1, VWS2, VWS3, and VWS4 from the popup menu 40 while pressing the left-mouse button, at operation S34.

The controller 12 checks whether the selected virtual workspace and the currently displayed first virtual workspace VWS1 are the same, at operation S35. Thus, if these two virtual workspaces are the same, the controller 12 links the currently displayed windows to the first virtual workspace VWS1, at operation S36.

However, the selected virtual workspace and the first virtual workspace VWS1 may be not the same. For example, if the user selects a window to move to the second virtual workspace VWS2, the controller 12 checks whether the selected window is the shared window, at operation S37. If the selected window is the shared window, the controller 12 allows the selected window to be activated in the first virtual workspace VWS1.

Meanwhile, if the selected window is not the shared window, the controller 12 changes the first data structure DS1 and the second data structure DS2 as a reference to the selected window to be linked to the second virtual workspace VWS2, at operation S38. Then, the controller 12 deletes the first data structure DS1 for the selected window in the second data structure DS2 for the first virtual workspace VWS1, at operation S39. Accordingly, the window moved to the currently displayed first virtual workspace VWS1 disappears.

Returning to FIG. 6, the popup menu 33 of the UI 30 may include a mouse-on bar 33c. If the user select the mouse-on bar 33c, the controller displays the virtual workspace selected by positioning while moving the cursor over the screen.

In more detail, every region of the screen corresponding to the respective virtual workspaces VWS1, VWS2, VWS3, and VWS4 are predetermined to the controller 12. For example, if the controller 12 according to the embodiment of the present invention supports four virtual workspaces VWS1, VWS2, VWS3, and VWS4, starting from an upper left corner, each of four corners of the screen of the display 20 is respectively set to a first region, a second region, a third region and a fourth region in clockwise. Further, the respective regions correspond to the first virtual workspace VWS1, the second virtual workspace VWS2, the third virtual workspace VWS3 and the fourth virtual workspace VWS4, respectively.

If the user selects the mouse-on bar 33c on the popup menu 33, the controller 12 detects where the cursor is placed over the screen. Accordingly, if the cursor is placed on one of the first region, the second region, the third region or the fourth region for a given time period, the controller 12 perceives that one of the first virtual workspace VWS1, the second virtual workspace VWS2, the third virtual workspace VWS 3 and the fourth virtual workspace VWS4 is selected and the current virtual workspace is shifted to the corresponding virtual workspace following operations S14 through S20 in FIG. 7.

Herein, the popup menu 33 on the UI may include a mouse-off bar 33d, and thus if the mouse-off bar 33d is selected, the mouse-on bar 33c is disabled and accordingly cannot select the virtual works as described above.

If the user shifts the virtual workspace, the controller 12 displays which virtual workspace is selected and thus displayed on the display 20, for a given time period. For example, if the first virtual workspace VWS1 is selected and displayed, the controller 12 displays a number or a symbol, or a text such as "1" or "space 1," etc., on a region on the screen for a couple of seconds to inform which virtual workspace is currently selected and displayed.

Further, the controller 12 may provide a transparent UI 30 to be overlapped over a desktop or windows corresponding to the respective virtual workspaces VWS1, VWS2, VWS3, and VWS4. Accordingly, although the UI 30 is set to be displayed on top of other windows, the user can still see the overlapped windows through the transparent UI 30. Moreover, the user does not need to remove other windows from the screen to control the UI 30.

A transparency bar 33b may be provided in the popup menu 33 of the UI 30 to adjust transparency of the UI 30.

The display apparatus includes the display 20; the data storage 11 storing the first data structure DS1 as a reference of at least one window, the second data structure DS2 as a reference of the windows and the corresponding virtual workspace to which the windows respectively linked based on the first data structure DS1 and the third data structure DS3 as a reference to the shared windows linked to all of the virtual workspaces VWS1, VWS2, VWS3, and VWS4; and the controller 12 providing the UI 30 to select one of the virtual workspaces VWS1, VWS2, VWS3, or VWS4, and displaying the shared windows and/or the windows referring to the first data structure DS1, the second data structure DS2 and the third data structure DS3 on the screen. Accordingly, the display apparatus provides a UI to support a plurality of virtual workspaces and simplify data to realize the plurality of virtual workspaces. Further, the UI shifts the virtual workspaces from one to another quickly and safely, and easily manages the plurality of virtual workspaces.

Although an embodiment of the present invention have been shown and described, the present invention is not limited to the described embodiment. Instead, it would be appreciated by those skilled in the art that changes may be made to the embodiment without departing from the principles and spirit of the invention, the scope of which is defined by the claims and their equivalents.

What is claimed is:

1. A method of shifting from one of a plurality of virtual workspaces to another of the plurality of virtual workspaces, comprising:

generating a first data structure as a reference of at least a window;

generating a second data structure as a reference of windows respectively linked to the virtual workspaces on the basis of the first data structure;

selecting the window as a window to be moved;

selecting one of the virtual workspaces to be moved;

determining whether the selected virtual workspace and the currently displayed virtual workspace are the same and displaying the selected window on the selected virtual workspace when the selected virtual workspace is determined to be the same as the currently displayed virtual workspace by linking the selected window to the selected virtual workspace;

determining whether the selected window is a shared window when the selected virtual workspace is determined not to be the same as the currently displayed virtual workspace, displaying the selected window on the current virtual workspace when the selected window is determined to be the same as the shared window, and changing the first data structure and the second data structure of the selected window so as to link the selected window to the another virtual workspace; and ending display of a window moved to the currently displayed virtual workspace by deleting the first data structure for the selected window in the second data structure for the currently displayed virtual workspace.

* * * * *

UNITED STATES PATENT AND TRADEMARK OFFICE
CERTIFICATE OF CORRECTION

PATENT NO. : 7,451,406 B2 Page 1 of 1
APPLICATION NO. : 11/132453
DATED : November 11, 2008
INVENTOR(S) : Sung-min Yoon It is certified that error appears in the above-identified patent and that said Letters Patent is hereby corrected as shown below:

Title Page, Item (74) (Attorney, Agent, or Firm), Line 1, change "Sttas" to --Staas--.

Signed and Sealed this

Tenth Day of February, 2009

JOHN DOLL
*Acting Director of the United States Patent and Trademark Office*